United States Patent
Tolley et al.

(10) Patent No.: US 7,413,689 B2
(45) Date of Patent: Aug. 19, 2008

(54) LENS ELEMENT FROM DIAMOND-TURNED THERMOPLASTIC RESIN

(75) Inventors: Paul Robert Tolley, Pittsford, NY (US); Richard A. Arndt, Penfield, NY (US)

(73) Assignee: Syntec Technologies Inc., Pavilion, NY (US)

( * ) Notice: Subject to any disclaimer, the term of this patent is extended or adjusted under 35 U.S.C. 154(b) by 166 days.

(21) Appl. No.: 10/907,228

(22) Filed: Mar. 24, 2005

(65) Prior Publication Data

US 2006/0215270 A1 Sep. 28, 2006

(51) Int. Cl.
*B29D 11/00* (2006.01)
(52) U.S. Cl. .......................................... 264/2.6; 264/2.7
(58) Field of Classification Search ................... 264/1.1, 264/2.6, 2.7
See application file for complete search history.

(56) References Cited

U.S. PATENT DOCUMENTS

| | | | |
|---|---|---|---|
| 5,715,091 A | | 2/1998 | Meyers |
| 6,086,204 A | * | 7/2000 | Magnante .................... 351/212 |
| 6,807,336 B2 | | 10/2004 | van Haasteren |
| 2001/0029816 A1 | | 10/2001 | Ben-Menachem et al. |
| 2003/0235050 A1 | | 12/2003 | West et al. |

OTHER PUBLICATIONS

GE Engineering Thermoplastics Design Guide.
Annealing. Guidelines from GE Plastics website (Geplastics.com).
Plastic Optics page. Sunex Inc. website at sunex.com.
Fabrication Guidelines page. Quadrant Engineering Plastic Products website at quadrantepp.com.
"Ultraprecision Machining of Polymers", Jeffrey W. Carr and Claudius Feger, Precision Engineering, 1993, pp. 221-237.

* cited by examiner

*Primary Examiner*—Mathieu D. Vargot
(74) *Attorney, Agent, or Firm*—Louis S. Horvath

(57) ABSTRACT

A method for fabrication of a lens element from a lens blank shaped from a high index, high thermal property thermoplastic resin conditions the surface of the lens blank by an extended annealing process. The temperature of the lens blank is increased to a soak temperature greater than 165 degrees C. over a ramp-up period of more than 2.5 hours, increasing the temperature during the ramp-up period by no more than 2 degrees C. per minute, on average. The lens blank is maintained at the soak temperature for a soak period of at least 3 hours. The temperature of the lens blank is lowered back to room temperature during a ramp-down period at a rate no faster than 1.5 degrees C. per minute, on average. This forms a conditioned lens blank that is diamond-turned to obtain an optical quality surface.

10 Claims, 2 Drawing Sheets

LENS ELEMENT FROM DIAMOND-TURNED THERMOPLASTIC RESIN

FIELD OF THE INVENTION

This invention generally relates to plastic lens fabrication and more particularly relates to apparatus and methods for fabricating lens elements from high thermal property amorphous thermoplastic resins using single-point turning.

BACKGROUND OF THE INVENTION

Optical components made of plastic are increasingly used in a wide variety of imaging, telecommunications, medical, defense, and other applications. Because they can be inexpensively molded in high volumes, plastic optical components provide a low cost alternative to conventional glass optics. Plastic lens elements have proved to be particularly advantageous where highly aspheric surfaces or multi-faceted lens elements are needed.

In conventional fabrication of plastic lenses, a mold is designed, machined, and finished to the precise shape requirements of the lens. A suitable high-grade thermoplastic material is then formed into a lens element using the mold in the injection molding process. A wide range of polymers can be used for lens element fabrication in this way, including acrylic (PMMA), polycarbonate (PC), polystyrene (PS), cyclic olefin polymer (COP), and a host of other materials.

As an alternative to molding, some types of plastics can also be machined to obtain optical quality surfaces, with varying degrees of success. Where this capability is available, it allows fast prototyping of optical components, particularly useful for testing and for research and development efforts, without the risk of capital investment in a mold that may not be reusable. However, because molding is the predominant method used for plastic optics fabrication, and because the degree of machining precision needed to obtain optical quality is not possible with many types of polymers, there has been less attention paid to defining and developing useful principles for precision machining of plastics in optical applications.

The high level of precision and accuracy needed for machining an optical surface can be provided by Single-Point Diamond Turning (also termed SPDT) machines, such as those manufactured by Moore Nanotechnology Systems of Keene, N.H. Such diamond turning apparatus are used for shaping optical components of various spherical, aspherical, toroidal, cylindrical, conic, and piano shapes, for example.

Many thermoplastics can be diamond turned to fairly coarse accuracy of within +/−0.1 mm, for example, sufficient for forming components used in a variety of commercial products. Unfortunately, however, only a subset of known thermoplastics can be diamond turned to the high levels of precision needed for forming optical surfaces, where peak-to-valley RMS surface roughness can be no greater than 100 Angstroms and is preferably much less than that amount. Several types of acrylics, for example, have been found to provide acceptable results for optical components using diamond turning methods; however, even these materials can prove difficult to work with except under specific conditions. Many polycarbonate materials prove too soft for diamond-turning to optical standards.

It is widely recognized in the optical fabrication arts that a plastic material must have suitable surface energy characteristics for precision diamond turning. Among other characteristics, a particular material must have suitable durometer, or hardness, in order to be effectively diamond-turned. Some polycarbonates, as noted above, are simply too soft. Other types of plastic prove too brittle for single-point diamond turning.

As a general observation, a number of low-index plastic materials have been found to be workable for precision diamond turning to optical standards. However, as has been acknowledged by at least one plastic optics fabricator, high-index plastic materials have proven to be much more difficult to tool. High index thermoplastic resins have an index of refraction greater than about 1.60.

Among plastics of growing interest for telecommunications and other applications are those having high transmittivity at red and near infrared (IR) light wavelengths, particularly from about 1200 nm to 1600 nm. Two amorphous thermoplastic resins having this transmittivity property are polyetherimide (PEI), manufactured and marketed by General Electric Company, Pittsfield, Mass. as ULTEM® and polyethersulfone (PES), manufactured and marketed by Solvay Advanced Polymers L.L.C., Alpharetta, Ga. as RADEL® A. Having relatively high indices of refraction (about 1.68 for PEI), high dimensional stability, and good resistance to chemicals and fatigue, both PEI and PES are particularly promising candidates for demanding applications using light in the IR region. Their high thermal properties make PEI and PES particularly advantageous for use in optical fiber couplers in data communications and telecommunications applications. Having high glass transition temperatures and being thermally stable at temperatures in excess of 200 degrees C., these plastics can effectively withstand the high levels of heat required for wave reflow solder processing in printed circuit board fabrication.

The use of PEI for lens elements is disclosed in the following, for example:

U.S. Patent Application Publication No. US 2003/0235050 by West et al. discloses a lens component used for a side-emitting LED;

U.S. Pat. No. 6,807,336 to van Haasteren discloses a molded lens formed from ULTEM.

As resins, PEI and PES have been primarily developed and marketed as thermoplastics for injection molding. As noted above, this allows lens elements to be fabricated inexpensively from these materials. According to product literature provided for these resins, precision machining operations, if described at all, are secondary operations at best, that may be employed for specialized use of these materials. As is noted in literature provided by various plastic components fabricators, PEI and PES, without filler materials, are acknowledged to be particularly difficult to machine. The durometer or hardness of stock PEI or PES thermoplastics is very high, not amenable to precision single-point diamond turning. For example, a number of plastic component fabricators, in comparing the overall machinability of various plastics, rate PEI and PES as significantly more difficult to machine than other optical plastics; with a rating of at least 7 on a scale from 1-10, where 10 indicates the most difficult.

To make versions of these thermoplastics that are more suitable for machining operations, manufacturers mix them with various glass fillers and other filler materials. However, while these filler materials allow easier machining, they render such thermoplastics as unusable for optical applications. Thus, optical-grade PEI and PES materials, being difficult to machine except to coarse precision, appear to offer little promise as candidates for high-precision optical machining.

For prototyping, as well as for small production runs, it would be highly advantageous to be able to fabricate lens elements from these and similar high index, high thermal property thermoplastic materials using single-point diamond turning. However, these materials, as supplied by the manufacturers, are particularly poorly suited to single-point diamond turning at the precision needed for optical quality. Conventional procedures for handling and pre-shaping lens blanks from these materials do not yield components having a compatible surface for diamond turning to form an optical surface. Therefore, it is widely held among those skilled in the optical plastic fabrication arts that PEI and PES, and similar types of high index, high thermal property thermoplastics, cannot be satisfactorily diamond turned to the optical quality needed for prototype or production-quality lens elements.

Conventional mold design is particularly costly, with typical mold prices often ranging in the tens of thousands of dollars. This makes molding a particularly expensive way to develop prototype plastic lens elements for initial development and testing efforts. Moreover, mold fabrication can take considerable time, often requiring 12 weeks or more. Time-to-market considerations can be highly significant, particularly in telecommunications, where short product lifetimes are anticipated for many types of components. Diamond turning, while not a preferred method for mass manufacture, potentially offers, to those who need prototypes, reduced lead times in terms of months and cost savings in terms of tens of thousands of dollars.

Thus, it can be seen that there would be particular benefits to methods and apparatus that provide single-point diamond-turned lens elements of high optical quality from PEI, PES, and similar high index, high thermal property thermoplastics.

SUMMARY OF THE INVENTION

It is an object of the present invention to provide a method for fabrication of a lens element comprising:

a) shaping a lens blank from a high index, high thermal property thermoplastic resin;

b) conditioning a surface of the lens blank by an extended annealing process comprising:

i) increasing the temperature of the lens blank to a soak temperature greater than 165 degrees C. over a ramp-up period of more than 2.5 hours, increasing the temperature during the ramp-up period by no more than 2 degrees C. per minute, on average;

ii) maintaining the lens blank at the soak temperature for a soak period of at least 3 hours;

iii) lowering the temperature of the lens blank back to room temperature during a ramp-down period at a rate no faster than 1.5 degrees C. per minute, on average, forming a conditioned lens blank thereby; and, c) diamond-turning the conditioned lens blank to obtain an optical quality surface.

It is a further object of the present invention to provide an unpolished lens element of a high index, high thermal property thermoplastic resin having a diamond-turned surface of optical quality, with an RMS peak-to-valley surface roughness of less than 100 Angstroms RMS.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
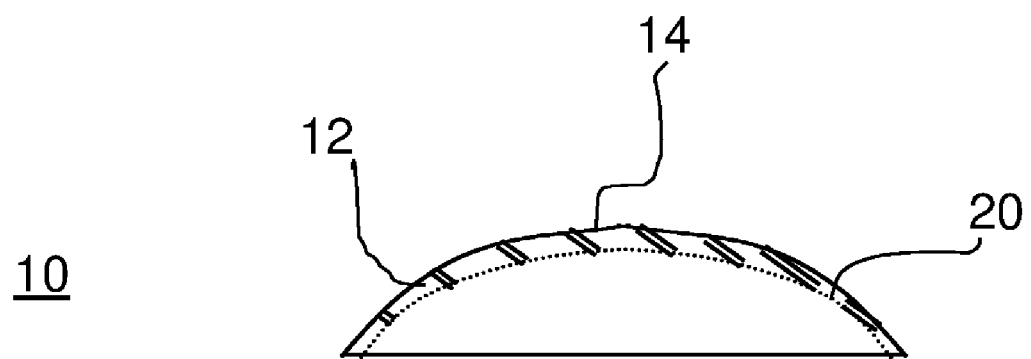
FIG. 1 is a side view of a lens blank prior to diamond turning according to the present invention.

For the description that follows, it is important to define threshold and preferred levels of optical quality for a diamond-turned optical surface. The suitability of a diamond-turned surface for optical applications is conventionally stated in units of RMS peak-to-valley surface roughness. As a minimum threshold level, an optical quality surface must not exhibit an RMS peak-to-valley surface roughness exceeding about 100 Angstroms. A surface with roughness exceeding this minimum threshold level would not be considered as being of optical quality. Preferably, a diamond turned optical quality surface exhibits RMS peak-to-valley surface roughness of not more than about 80 Angstroms.

As noted in the background section given above, high thermal property thermoplastic resins have high glass transition temperatures and are thermally stable at temperatures in excess of 200 degrees C. Both PEI and PES, for example, have glass transition temperatures near 220 degrees C.

It is instructive to distinguish an optical quality surface obtained by single-point diamond turning methods that meets the above requirements from a diffractive surface that has been deliberately formed into a lens surface using single-point diamond turning. For example, U.S. Pat. No. 5,715,091 to Meyers discloses a diffractive lens surface having structures formed by diamond turning, where the structures on the plastic lens are spaced apart by at least tens of microns and exhibit echelon or draft depths from about 0.8 to 1.4 microns. As the Meyers patent shows, diamond turning techniques have been used to form uniformly spaced structures onto the surface of a plastic lens. However, the scale of these diffractive structures and the use of diamond turning techniques for their fabrication differs significantly from the requirements for optical quality surfaces.

Annealing is a known process for reducing internal stress in components that have been injection molded or machined from plastics. In annealing, a stressed material is exposed to a heat level above its glass transition point and held there for a time period that allows the material to return to a more relaxed state. The annealing process is recommended by materials manufacturers for treating precision components of PEI and PES materials once they have been formed.

Some guidelines for conventional annealing procedures are provided by materials manufacturers. For PEI resin, for example, it is recommended that a molded or machined part be raised to a temperature of 400 degrees F. (204 degrees C.) over a period of two hours, held at this "soaking" temperature for an additional two hours, then lowered slowly back to room temperature. In general, equal ramp-up and ramp-down times are suggested. That is, in the recommended temperature vs. time profile, temperature ramp-up and ramp-down slopes from the "soaking" time period are given as equal in magnitude and opposite in sign. The length of soaking time may be varied based on the thickness of molded or machined components or their overall shape.

In optical fabrication, annealing may be performed once a plastic lens is removed from its mold or is machined. This conventional application of annealing serves to stabilize the plastic structure for its subsequent use, particularly for high-stress lens components. Annealing, however, is not commonly performed as an intermediate step in lens fabrication.

The inventors have found that a lens blank formed from PEI or PES resin is unsuitable, unless conditioned as described hereinbelow, for single-point diamond turning where optical quality is needed. Moreover, simply annealing the lens blank after it is coarsely machined and prior to single-point diamond turning effects no improvement if the conventional annealing practices and time intervals recommended by PEI and PES manufacturers and published by fabricators of plastic lenses are used. Contrary, then, to conventional practice and to recommendations from manufacturers, an extended annealing process, following coarse machining and repeated if necessary between successive coarse machining operations, can render the surface of PEI and PES materials to be better suited for diamond turning. The combination of this extended annealing process, as described subsequently, along with careful selection of diamond turning tools and feed and speed rates, makes it possible to form an optical quality surface on a lens element made of PEI or PES resin using diamond turning.

Process Description

The present invention applies the following innovative process for fabrication of a lens element from PEI or other amorphous, high index, high thermal property thermoplastic, such as PES. This sequence has been used for successful diamond turning fabrication of lenses from Ultem 1000 of 25 mm diameter and having 12.5 mm and 7.5 mm radius of curvature: Lens thickness was in the 4 mm range.

1) Form the lens blank. In this step, the initial rough form of the lens is prepared from stock material by cutting and coarse-shaping on a lathe or other machine. The resultant lens blank roughly approximates the overall lens shape and includes an amount of material to be removed by SPDT methods in a subsequent step. Typically about 127 microns (0.005 in.) of waste material is to be removed from the lens blank. This first step is fairly straightforward, following conventional practices that would be used for other types of thermoplastic materials being prepared for SPDT processing.

2) Prepare the lens blank using an extended annealing process to form a conditioned lens blank. The inventors have found that a range of annealing times well in excess of those conventionally used or recommended by PEI or PES material manufacturers conditions the surface of a lens blank that has been formed from these materials. For the 25 mm diameter lenses noted above, the following sequence has been shown to provide suitable surface preparation for single-point diamond turning, where using conventional annealing timing would result in failure:

a) Ramp up from room temperature to a peak soaking temperature of between 175 and 217 degrees Centigrade over a period that is preferably at least about 2.75 hours. A suitable ramp-up slope for this temperature increase is preferably in the range of no more than about +1.5 degrees per minute. As a minimum threshold value, the soak temperature should exceed 165 degrees C.; temperatures below this threshold value do not appear to yield the desired result. Temperatures above 190 degrees C. can be particularly advantageous. A minimum threshold for the ramp-up period would be 2.5 hours. The ramp-up slope should not exceed an upper limit of +2 degrees per minute.

b) Maintain the peak soaking temperature for an extended period of time. For the aspheric lens of one embodiment, the peak soaking temperature was maintained for about 4 hours. This time period is at least double the recommended time period for conventional machined or molded finished parts using PEI or PES. As a minimum threshold value, the soaking period could be shortened slightly, such as to 3.5 hours, but not to less than 3 hours. Some tolerance variability may be permissible for temperature, but not more than +/−10 degrees C. and not dropping below the minimum threshold of 165 degrees C.

c) Lower the oven temperature from the peak soaking temperature to room temperature at a slow rate. A preferable slope for this temperature ramp-down is in the range of −1 degree per minute. In general, a ramp-down time in excess of the ramp-up time used in step a) has proven to be advantageous. For the aspheric lens noted above, a minimum ramp down time of 3 hours proved suitable. As a maximum threshold rate, the ramp-down slope should not exceed −1.5 degrees per minute.

3) Diamond turn the conditioned lens blank that has been annealed as in step 2 above. Experience has shown that best surface results are obtained when using a very fine cutting tool, such as one having a 300 micron to 800 micron (0.010 in. to 0.030 in.) radius. The contact surface of the cutting tool should range between 280 microns and 900 microns. Suction or other method is employed during the turning operation to remove any powder generated from the tool contact area. A series of staged cuts, or passes over the surface, has been shown to be particularly advantageous. In one embodiment, four successive cuts were taken. Cut depths for the four cuts were of the following order: (i) 50 microns, (ii) 50 microns, (iii) less than 25 microns, and (iv) less than 10 microns. Thus, in these four successive cuts, somewhat less than 130 microns of waste material was removed.

Figure 2:
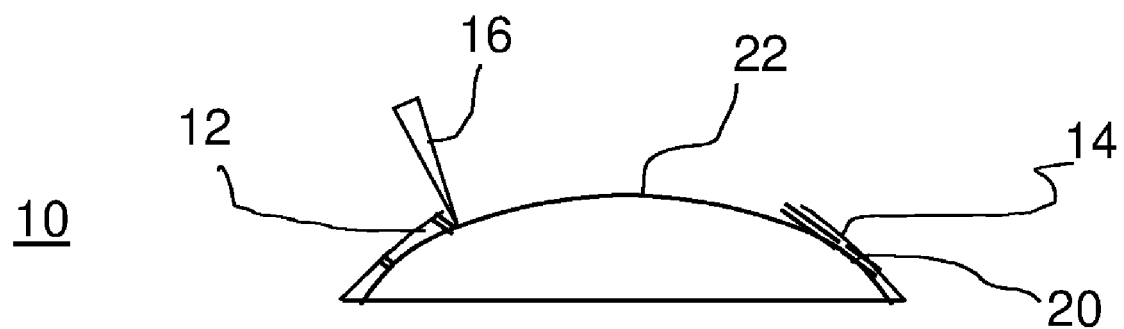
FIG. 2 is a side view of a lens blank during diamond turning.
Figure 3:
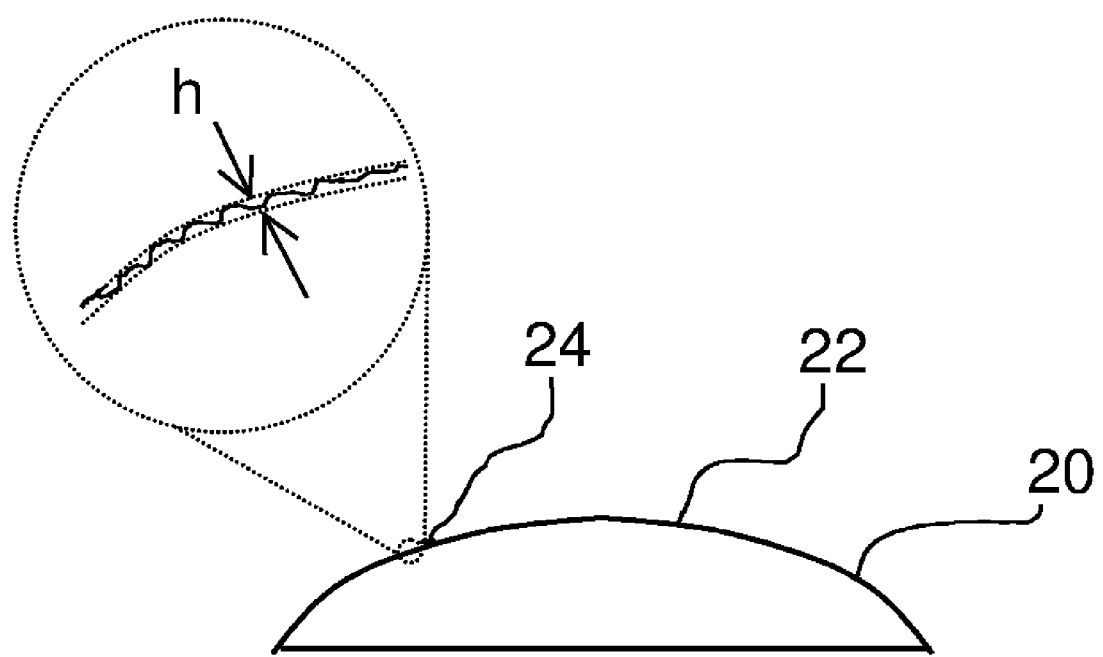
FIG. 3 is a side view of a diamond-turned lens fabricated according to the present invention.

The cross-sectional views in FIGS. 1, 2, and 3 show, in exaggerated form, the sequence by which an annealed lens blank 10 becomes a finished, turned lens element 20 in step 3) above. Referring first to FIG. 1, there is shown conditioned lens blank 10 after the extended annealing process of step 2) above. Lens blank 10 is coarsely machined to have a surface 14 that approximates the desired shape of turned lens element 20, shown as a dotted line in FIG. 1. A waste layer 12 is to be removed by the diamond turning process. Typical thickness for waste layer 12 would be about 127 microns (0.005 in.) or less.

Particularly because of the brittleness of PEI, PES, and other similar amorphous thermoplastic resins, surface 14 of waste layer 12 typically has many minute fractures (not shown) that result from coarse machining. The process of following extended annealing with more than two staged cuts enables waste layer 12 to be efficiently removed from the surface in powder form during single-point turning.

FIG. 2 summarizes what happens to lens blank 10 during the diamond turning process of step 3) above. A diamond turning tool 16 is applied to lens blank 10 as it is rotated, removing waste layer 12 and forming a turned surface 22 that gives finished shape to turned lens element 20. Again, in practice, multiple staged cuts using tool 16 are employed.

FIG. 3 shows completed turned lens element 20. An enlarged portion of surface segment 24, highly exaggerated for the purpose of description, shows peak-to-valley height h, used as a measure of optical quality for turned surface 22.

With PEI, PES, and similar thermoplastics, optical quality does not appear to be obtainable if conventional methods using manufacturer's guidelines and standard practices for annealing are followed after forming lens blank 10. Attempts to diamond turn lens blank 10 prepared in the conventional manner typically result in damage to turned surface 22, rendering the results as unusable. Using conventional annealing practices and times, PEI and PES thermoplastics can be turned to some measure of accuracy, at no better than the 120 to 180 Angstrom range for peak-to-valley RMS surface roughness. However, as has been noted above, the threshold roughness for optical quality is at about 100 Angstroms.

There is no suggestion in manufacturer's literature or in standard practice that either an intermediate annealing process or increased annealing times, over and above conventional recommended intervals, render a coarsely machined material more suitable for diamond turning. Using conventional practices and recommended temperature vs. time exposure fails to yield lens elements that can be successfully diamond turned. The inventors have found, however, that in the interim between coarse machining of the lens blank and diamond turning, annealing over time intervals well in excess of those recommended in manufacturer's guidelines can yield a lens blank that is capable of being diamond-turned to provide a lens having optical quality. Additionally, by applying more than the conventional two staged diamond turning cuts, the inventors have identified a process that enables diamond turning of high-index, high temperature property PEI and PES amorphous thermoplastics with high yields.

For practicing the method of the present invention for lens element fabrication, determining a suitable annealing time depends on a number of variables, including the following:

(i) Center thickness of the lens element. As a general rule, the thicker the component, the more annealing time recommended. For a center thickness in excess of about 8 mm or 25% of the outer diameter (O.D.), temperature ramp-up time should not exceed about 1.5 degrees per minute. Soak time should be a minimum of 3 to 4 hours. Ramp-down time should not exceed about 1 degree per minute.

(ii) Geometric characteristics of the form finish. For example, a shape that is highly aspheric is more likely to exhibit high internal stress, thus benefiting from longer ramp-up, soak, and ramp-down periods. With sharply aspheric and hemispheric shapes, ramp-up time should not exceed about 1 degree per minute. Soak time should be a minimum of 3 to 4 hours. Ramp-down time should not exceed about 1 degree per minute.

For plano surfaces and weak curves (that is, more gently sloping curves) ramp-up and ramp-down times can be symmetric and at faster rates, for example, at 1.5 to 2 degrees per minute. Soak time can also be reduced to a minimum of about 2.5 hours; however, longer soak times yield much better results, even for low-stress shapes with these materials.

(iii) Desired surface roughness. For a high-quality optical surface, extended annealing times would be recommended.

(iv) Center-to-edge thickness ratio. Related to variables (i) and (ii) above, the center-to-edge thickness ratio provides an indicator of the overall level of stress for the lens element.

Waste layer 12 thickness may vary over a range. This thickness will depend on cutting tool size, cut depths used, and rate of cut.

The extended annealing times that have been used condition surface hardness characteristics of coarsely machined lens blank 10, allowing removal of waste layer 12 without causing damage to the resultant turned lens element 20 over turned surface 22. Among other advantages, this conditioning effect allows dust and debris from waste layer 12 to be readily removed from the contact area of tool 16 by vacuum, thus minimizing possible damage to turned surface 22 from obstructing waste material. The thermoplastic material itself does not appear to be changed as a result of the extended annealing process, however.

Proper selection of tool 16 characteristics and operating parameters is also an important factor. Unlike the conventional diamond turning practices recommended for these materials in general applications, the preparation of turned surface 22 having optical quality requires that tool 16 have a very small radius. Typical tool size is in the range of 300 micron to 800 micron radius. As is shown in FIG. 2, the preferred tool angle is at or near normal with respect to turned surface 22.

Tool speed rates and speed rates for turning PEI, PES, and related thermoplastic materials follow conventional guidelines for turning of optical components. Attempts to cut too deeply can cause damage to the lens surface.

The oven used for the annealing process is preferably some type of programmable oven, such as those manufactured by VWR International, West Chester, Pa. Maintaining temperatures within the tolerances noted above is recommended.

Some lens shapes may benefit from repeated cycles in which coarse shaping is followed by the extended annealing of step 2) above. For example, highly aspheric lens elements may justify the use of additional annealing cycles. In such a case, the last annealing process used should be particularly extended, since diamond turning will follow this process.

The method of the present invention has proven successful in producing a lens of polyetherimide having high optical quality that is ideally suited for use in the IR range. Lens surface roughness on the order of 80 Angstroms or less, RMS peak-to-valley has been obtained, without any polishing. This same type of processing is suitable for shaping optical surfaces of PES, PEI, and other high index, high thermal property optical thermoplastics as well. In this way, the method of the present invention allows this group of thermoplastics, previously held to be ill suited for diamond turning fabrication, to be fabricated to optical quality using single-point diamond turning techniques, allowing their use for lower cost prototypes with faster turnaround times and for small production runs.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, a number of different types of coarse machining operations could be used for forming the lens blank. The lens element that is fabricated could be any of a number of possible shapes, such as spherical, aspherical, toric, cylindrical, conic, and piano shapes. The lens element thus formed could have a variety of surface structures such as prism shapes of various types, provided that these are compatible with diamond turning geometry. The lens element could be provided with diffractive structures formed using diamond turning.

Thus, what is provided is a lens element of a high index, high thermal property thermoplastic resin having a diamond-turned surface of optical quality and a method for forming such a lens element.

PARTS LIST

10. Lens blank
12. Waste layer
14. Lens blank surface
16. Tool
20. Turned lens element
22. Turned surface
24. Surface segment
h. Peak-to-valley height

What is claimed is:

1. A method for fabrication of a lens element comprising:
   a) shaping a lens blank from a polyetherimide or polyethersulfone thermoplastic resin;

b) conditioning a surface of the lens blank by an extended annealing process comprising:
  i) increasing the temperature of the lens blank to a soak temperature greater than 165 degrees C. over a ramp-up period of more than 2.5 hours, increasing the temperature during the ramp-up period by no more than 2 degrees C. per minute, on average;
  ii) maintaining the lens blank at the soak temperature for a soak period of at least 3 hours;
  iii) lowering the temperature of the lens blank back to room temperature during a ramp-down period at a rate no faster than 1.5 degrees C. per minute, on average, forming a conditioned lens blank thereby; and,
c) diamond-turning the conditioned lens blank to obtain an optical quality surface with an RMS peak-to-valley surface roughness of less than 100 Angstroms RMS.

2. The method of claim 1 wherein diamond-turning the conditioned lens blank comprises the step of using a tool having a contact surface of between 280 microns and 900 microns.

3. The method of claim 1 wherein the step of increasing the temperature of the lens blank comprises increasing the temperature during the ramp-up period by no more than 1.5 degrees C. per minute, on average.

4. The method of claim 1 wherein the step of maintaining the lens blank at the soak temperature comprises maintaining the lens blank at the soak temperature of at least 190 degrees C., within +/−10 degrees C., for a soak period of at least 3.5 hours.

5. The method of claim 1 wherein the step of lowering the temperature of the lens blank back to room temperature comprises lowering the temperature during a ramp-down period at a rate no faster than 1 degree C. per minute, on average.

6. The method of claim 1 wherein the step of diamond-turning the conditioned lens blank comprises taking more than two cuts over the surface of the conditioned lens blank with the diamond turning tool.

7. The method of claim 1 wherein the step of diamond-turning the conditioned lens blank forms a surface shape taken from the group consisting of spherical, aspherical, toric, cylindrical, conic, and plano shapes.

8. The method of claim 1 wherein diamond-turning forms the optical quality-surface with an RMS peak-to-valley surface roughness of less than 80 Angstroms RMS.

9. The method of claim 1 wherein diamond-turning forms a plurality of diffractive structures on the optical quality-surface.

10. The method of claim 1 wherein the lens blank thickness is 25 mm or less.

* * * * *